United States Patent [19]

Erickson et al.

[11] Patent Number: 4,954,124
[45] Date of Patent: Sep. 4, 1990

[54] STAND-UP PLASTIC BAG AND METHOD OF MAKING SAME

[75] Inventors: Laurence R. Erickson; R. Douglas Behr; Roger D. Vrooman, all of Midland, Mich.

[73] Assignee: The Dow Chemical Company, Midland, Mich.

[21] Appl. No.: 303,310

[22] Filed: Jan. 30, 1989

Related U.S. Application Data

[63] Continuation of Ser. No. 171,053, Mar. 21, 1988, Pat. No. 4,837,849.

[51] Int. Cl.⁵ .............................................. B31B 37/64
[52] U.S. Cl. .................................. 493/195; 493/189; 156/308.4
[58] Field of Search ............... 493/189, 190, 193, 194, 493/195; 156/308.4; 428/212

[56] References Cited

U.S. PATENT DOCUMENTS

| | | | |
|---|---|---|---|
| 2,265,075 | 12/1941 | Kneutter | 93/35 |
| 2,370,680 | 3/1945 | Moore | 493/189 |
| 3,380,646 | 4/1968 | Doyen et al. | 229/57 |
| 3,437,258 | 4/1969 | Kugler | 229/58 |
| 3,456,855 | 7/1969 | Mutter | 225/96 |
| 3,483,061 | 12/1969 | Takahashi et al. | 156/380 |
| 3,508,473 | 4/1970 | Ericson | 93/35 |
| 3,599,538 | 8/1971 | Piazze | 493/194 |
| 3,618,478 | 11/1971 | Piazze | 493/194 |
| 3,715,074 | 2/1973 | Michel | 229/57 |
| 3,935,993 | 2/1976 | Doyen et al. | 229/53 |
| 3,980,225 | 9/1976 | Kan | 229/57 |
| 4,055,109 | 10/1977 | Kan | 93/35 |
| 4,144,438 | 3/1979 | Gelman et al. | 219/10.55 |
| 4,210,686 | 7/1980 | Gajewski et al. | 428/516 |
| 4,353,497 | 10/1982 | Bustin | 229/55 |
| 4,390,573 | 6/1983 | Bullard et al. | 428/212 |
| 4,505,699 | 3/1985 | Totani | 493/196 |
| 4,539,793 | 9/1985 | Malek | 493/189 |
| 4,601,699 | 7/1986 | Ausnit | 493/381 |
| 4,658,433 | 4/1987 | Savicki | 383/63 |
| 4,828,892 | 5/1989 | Kersten et al. | 428/212 |

FOREIGN PATENT DOCUMENTS

| | | | |
|---|---|---|---|
| 1445215 | 8/1976 | United Kingdom | 383/122 |
| 2047199 | 11/1980 | United Kingdom | |

*Primary Examiner*—William Terrell

[57] ABSTRACT

A stand-up plastic bag has a pair of front and rear side walls defining an open bag mouth at upper edges thereof, and a pair of front and rear bottom gusset walls being disposed between the side walls. The walls are composed of a multi-layered film of different, heat-sealable, coextruded thermoplastics, such as polyethylene and Nylon. Polyethylene is on the interior surfaces and Nylon is on the exterior surfaces of the walls. The gusset walls have upper portions interconnected together to form a bottom wall extending between the front and rear side walls. The gusset walls also have lower portions joined by heat seals to lower portion of the front and rear side walls at contiguous portions of polyethylene material on their interior surfaces to form a support band which connects to and extends below the bottom wall. The front and rear gusset walls also have opposite longitudinal edges joined together by heat seals at contiguous portions of Nylon material on the exterior surfaces thereof which complete formation of the support band as a continuous self-standing structure that defines with the bottom wall a stand-up base on the bag.

8 Claims, 3 Drawing Sheets

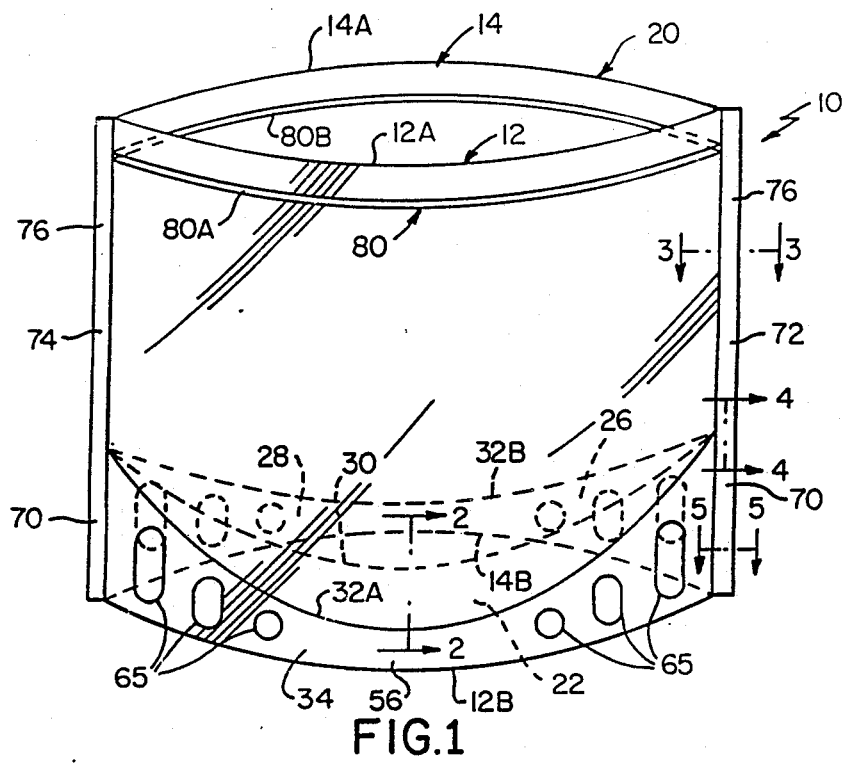
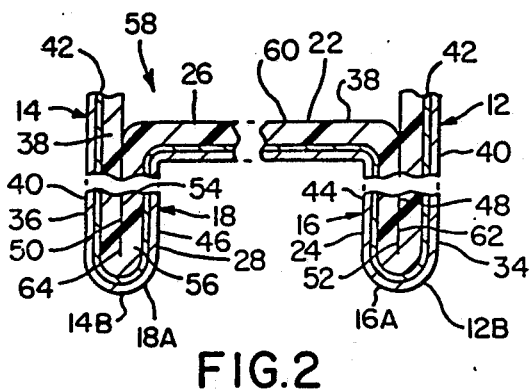
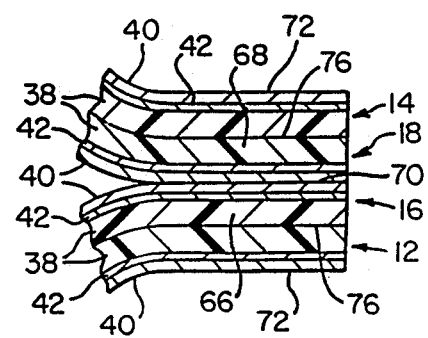
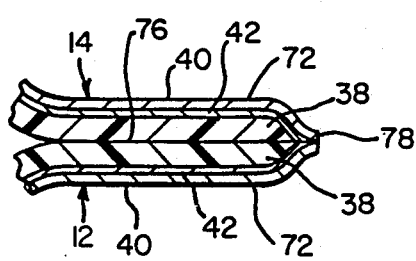
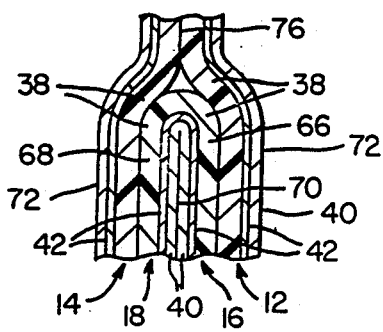
FIG.1
FIG.2
FIG.5
FIG.3
FIG.4

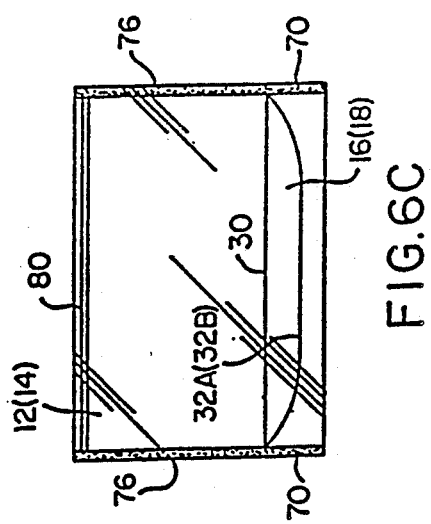
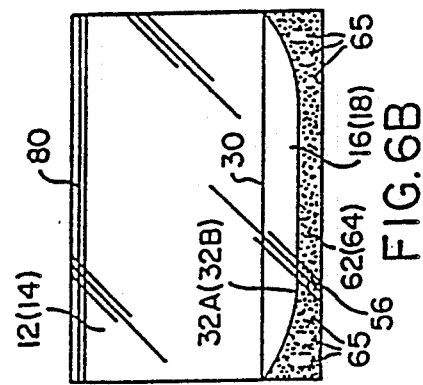
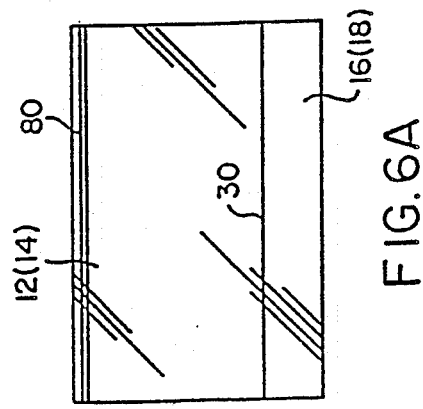

STAND-UP PLASTIC BAG AND METHOD OF MAKING SAME

This is a continuation of application Ser. No. 171,053 filed Mar. 21, 1988 now U.S. Pat. No. 4,837,849.

BACKGROUND OF THE INVENTION

The present invention generally relates to plastic bags and, more particularly, to a plastic bag capable of standing up by itself before, during and after being filled and to a method making the bag.

So-called stand-up, free-standing or self-standing plastic bags are well-known in the prior art. Representative of the prior art are the plastic bags disclosed in U.S. Pat. Nos. to Knuetter (2,265,075), Doyen et al (3,380,646), Kugler (3,437,258), Michel (3,715,074) and Bustin (4,353,497). Also, well-known in the prior art are plastic bags incorporating a zipper-type closure device along the top opening or mouth of the bags. Representative of the prior art are the plastic bags disclosed in a U.S. Pat. No. to Ausnit (4,601,694) and a U.K. Patent Application to Kirkpatrick (2,047,199). Further, U.S. Pat. Nos. to Kan (3,980,225 and 4,055,109) disclose a self-standing plastic bag which also incorporates a zipper-type closure device along its mouth.

Market research has shown that consumers greatly desire a stand-up, reclosable plastic bag because of the convenience of filling and storing highly liquid foods and of microwave heating of foods directly in the bag. Some known stand-up bags attempt to provide the stand-up capability merely by use of a simple bottom gusset alone or supplemented with seals added in the gusset structure. A simple bottom gusset sealed at its sides does not provide a normal consumer plastic bag with a sufficient stand-up feature. Such plastic bag typically made from polyethylene film, for example of under 1.0 mil thickness, is too limp to stand up from the gusseted bottom.

Other plastic films of greater thickness and higher modulus can be fabricated into a bag that will stand up from a simple bottom gusset. One plastic bag currently available uses a very deep bottom gusset design to provide certain advantages in food storage and microwave heating, but some difficulty has been experienced in filling and emptying this bag. The bag does not stand up easily when empty, and the zipper-type closure is difficult to maintain open when filling and emptying this bag. Other currently-available stand-up bags seal the bottom gusset into a stand-up base that is much more stable than the simple bottom gusset. The self-standing bag of the above-cited U.S. patents to Kan is an example of a bag having such stand-up base.

It is perceived that additional improvements need to be made before consumers will be provided with a stand-up reclosable plastic bag that fully meets their needs. These improvements must relate to the provision of a bag with a stronger, sturdier and more stable stand-up base, one which will faithfully support the bag when empty as well as during and after filling, and a bag with a more reliable, leak-proof side seam. Aslo, the improvements must allow a simpler and less costly method of making the bag.

SUMMARY OF THE INVENTION

The present invention provides a stand-up plastic bag and method of making same designed to satisfy the aforementioned needs.

The stand-up plastic bag of the present invention comprises a pair of front and rear side walls which define an open mouth at upper edges of the side walls, and a pair of front and rear bottom gusset walls disposed between the side walls. The front and rear side walls and the front and rear bottom gusset walls are composed of a multi-layered film of first and second heat-sealable thermoplastic materials. The first material is on interior surfaces of the walls and heat-sealable at a temperature within a first temperature range. The second material is on exterior surfaces of walls and heat-sealable at a temperature within a second temperature range greater than the first temperature range.

The bottom gusset walls have upper portions that are interconnected together to define a bottom wall extending between the front and rear side walls. The bottom gusset walls also have lower portions joined by heat seals to lower portions of the front and rear side walls at contiguous portions of the first material on the interior surfaces thereof to form a support band connected to and extending below the periphery of the bottom wall. The bottom gusset walls further have opposite longitudinal edges joined together by heat seals at contiguous portions of the second material on the exterior surfaces thereof which complete formation of the support band as a continuous self-standing structure and define with the bottom wall a stand-up base on the bag.

Further, the front and rear side walls and the front and rear bottom gusset walls along opposite longitudinal edges of the walls are joined together by heat seals at contiguous portions of the first material on interior surfaces thereof. Also, an openable and closable closure device is defined on the front and rear side walls below and adjacent to the bag mouth defined at the upper edges of the side walls.

The method of the present invention for making the stand-up plastic bag comprises the steps of: supplying a multi-layered film of the first and second heat-sealable thermoplastic materials; folding the film to form the front and rear side walls and the front and rear bottom gusset walls disposed between the side walls with interior surfaces of the walls having the first material thereon and exterior surfaces of the walls having the second material thereon; forming heat seals which join lower portions of the front and rear bottom gusset walls with corresponding lower portions of the front and rear side walls at contiguous regions of the first material on the interior surfaces thereof and thereby form a support band being connected to and extending below the periphery of a bottom wall formed by connected upper portions of the front and rear bottom gusset walls which extend between the front and rear side walls; forming heat seals which join the front and rear side walls with the front and rear bottom gusset walls along opposite longitudinal edges thereof at contiguous portions of the first material on interior surface of the longitudinal edges of the walls; forming heat seals which join the front and rear bottom gusset walls together along their opposite longitudinal edges at contiguous portions of the second material on the exterior surfaces thereof and thereby complete formation of the support band as a continuous self-standing structure to define with the bottom wall a stand-up base on a bag; and separating the film into completed plastic bags by severing the film through at each of the heat seals at each of the longitudinal edges of the walls.

Accordingly, it is an object of the present invention to provide a stand-up plastic bag that has a stronger, sturdier and more stable stand-up base capable of supporting the bag whether empty or full; to provide a stand-up plastic bag that has more reliable, leak-proof side seams; and to provide a stand-up plastic bag that is simpler and less costly to make because of its employment of heat seals between materials on the interior surfaces and a heat seal between materials on the exterior surfaces of the longitudinal ends of the gusset walls which eliminate the necessity of punching holes or cutouts through the gusset walls, as done in prior art bags, in order to seal the opposite side walls of the bag together in the region of the gusset wall longitudinal ends; and to provide a method of making such a stand-up plastic bag. Other objects and advantages of the invention will be apparent from the following description, the accompanying drawings and the appended claims.

BRIEF DESCRIPTION OF THE DRAWINGS

FIG. 1 is a perspective view of a first embodiment of a stand-up plastic bag constructed in accordance with the principles of the present invention.

FIG. 2 is an enlarged cross-sectional view of the bag taken along line 2—2 of FIG. 1.

FIG. 3 is another enlarged cross-sectional view of the bag taken along line 3—3 of FIG. 1.

FIG. 4 is yet another enlarged cross-sectional view of the bag taken along line 4—4 of FIG. 1.

FIG. 5 is still another enlarged cross-sectional view of the bag taken along line 5—5 of FIG. 1.

FIG. 6A is a front elevational view of a section of the film web representing one bag blank moving through the appartus of FIG. 6, illustrating the condition of the bag blank after the film folding, gusset forming and closure locking operations have been completed by the apparatus.

FIG. 6B is another front elevational view of the same bag blank moving through the apparatus of FIG. 6, illustrating the condition of the bag blank after the gusset sealing operation has been completed.

FIG. 6C is yet another front elevational view of the same bag blank moving through the apparatus of FIG. 6, illustrating the condition of the bag blank after the side seam double-sealing operations have been completed.

DETAILED DESCRIPTION OF THE PREFERRED EMBODIMENT

Figure 6:
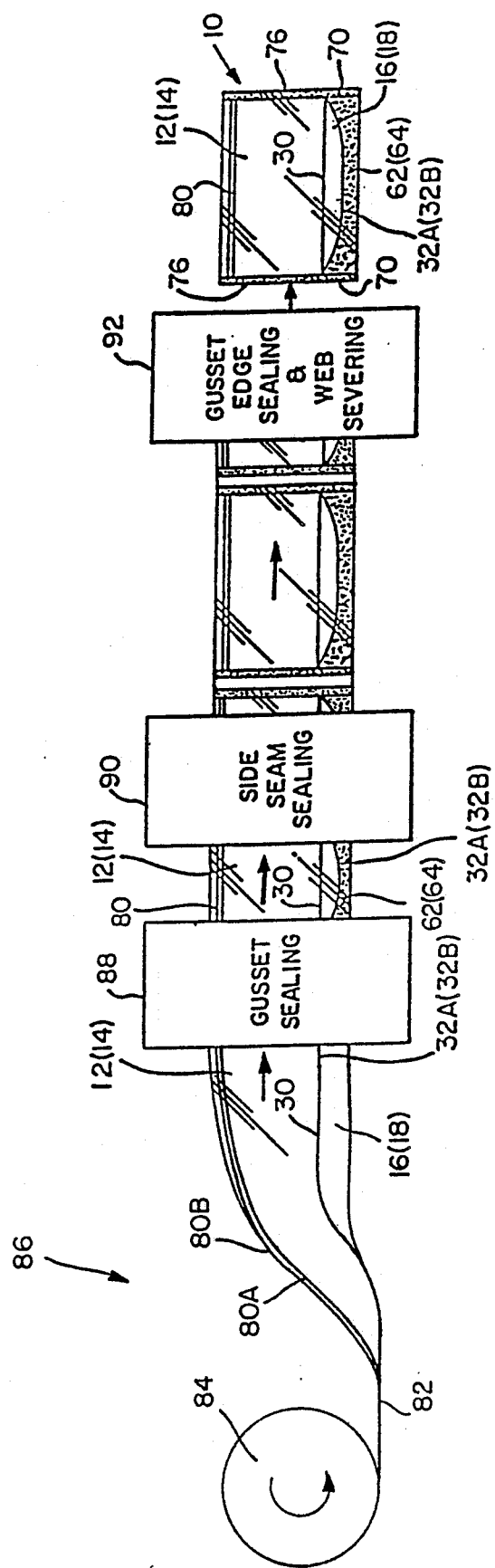
FIG. 6 is a block diagram of the apparatus for carrying out the method of the present invention for making a stand-up plastic bag, and also a front elevational view of the bag of the first embodiment as produced by the method.

Reference is made to FIGS. 1-5 of the drawings which illustrate a stand-up plastic bag, generally designated 10 and comprising one embodiment of the present invention. In its basic components, the bag 10 includes a pair of front and rear side walls 12, 14 and a pair of front and rear bottom gusset walls 16, 18 (see FIGS. 2-5). The side walls 12, 14 define an open mouth 20 for the bag 10 between upper edges 12A, 14A of the walls 12, 14. The front and rear bottom gusset walls 16, 18 are disposed between the side walls 12, 14 and each have respective upper and lower portions 22, 24 and 26, 28. The upper portions 22, 26 of the gusset walls 16, 18 are integrally connected and foldable relative to one another about a center fold line 30. The upper portions 22, 26 of the gusset walls 16, 18 are integrally connected and foldable relative to the respective lower portions 24, 28 thereof about front and rear fold lines 32A, 32b. Also, the lower portions 24, 28 of the gusset walls 16, 18 at their lower edges 16A, 18A are integrally connected and folded relative to the lower edges 12B, 14B of the side walls 12, 14.

Referring specifically to FIG. 2, there is illustrated a cross-section taken through lower portions 34, 36 of the front and rear side walls 12, 14 corresponding to the lower portions 24, 28 of the front and rear bottom gusset walls 16, 18. The composition of the film of which each of the walls 12-18 is formed is depicted most clearly in FIG. 2 wherein it is illustrated that the film is multi-layered, being composed of two different heat-sealable thermoplastic materials 38 and 40 and an adhesive or glue material 42 there between bonding the two thermoplastic materials together. It is important that the thermoplastic materials selected be heat-sealable at different ranges of temperatures. Particularly, the material 38 which ultimately will be on the interior surfaces of the walls 12-18 must be heat-sealable within a temperature range which is lower than the temperature range at which the material 40 on the exterior surfaces of the walls 12-18 will be heat sealable. Maintenance of this difference in heat sealing temperature ranges between the exterior and interior surfaces of the walls 12-18 is important in order to avoid heat sealing together the facing exterior surfaces 44, 46 of the front and rear bottom gusset walls 16, 18, shown in FIG. 2, at the same time that the interior surfaces 48, 50 of their lower portions 24, 28 which face interior surfaces 52, 54 of the lower portions 34, 36 of the front and rear side walls 12, 14 are heat sealed thereto to form a support band 56 of a stand-up base 58 for the bag 10, as will be described in detail below.

By way of example, the preferred composition of the film is a multi-layer coextrusion of Nylon (polyamide)/glue/PE (polyethylene) in thicknesses of about 0.1–1.0 mils, 0.1–0.5 mils and 0.5–5.0 mils respectively. Bag stability has been found to increase with film modulus (stiffness). The heat sealing temperature range of the polyethylene material 38 is from about 125° to 190° C. The preferred temperature for heat sealing the material 38 on the interior surfaces of the walls 12-18 is approximately 130° to 150° C. The heat sealing temperature range of the Nylon material 40 is from about 190° to 280° C. The preferred temperature range for heat sealing the material 40 on the exterior surfaces of the walls 12-18 is approximately 210° to 250° C. Other materials, thicknesses and heat sealing temperature ranges are possible. For example, thermoplastics like polycarbonate, polyester, polyvinylidene chloride, poly-4-methyl-1-pentene, polyphenylene sulfide and other higher temperature sealing thermoplastics may be substituted for the Nylon and other polyolefins, polyvinylchloride, ethylene vinyl acetate, polystyrene, polyisoprene, and other lower temperature sealing thermoplastics may be substituted for the polyethylene.

The preferred composition of the film is particularly well suited for a stand-up bag to hold hot liquids—i.e. it may be used for boiling water temperature liquids in either microwave or in boiling water heating. The Nylon layer has high modulus and high heat distortion features which add to hot liquid stand up stability and boiling water performance.

The preferred composition of the film is also particularly well suited for freezer use. The relatively thick polyethylene layer provides toughness and flexibility even at freezer temperatures.

Referring still to FIG. 2 as well as FIG. 1, it will be seen that the upper portions 22, 26 of the front and rear bottom gusset walls 16, 18 are interconnected together to define a bottom wall 60 which extends between the front and rear side walls 12, 14 and which, because of the other feature of the bag of the present invention, will present a relatively flat support base when the bag is in use. Thus, the lower portions 24, 28 of the front and rear bottom gusset walls 16, 18 are joined by heat seals 62, 64 to lower portions 34, 36 of the front and rear side walls 12, 14 at contiguous portions of the thermoplastic material 38 on their respective interior surfaces 48-54. By such heat seals 62, 64, the gusset and side wall lower portions 24, 28 and 34, 36 cooperate to form the upright support band 56 which is connected to and extends below the periphery of the bottom wall 60. The configuration of the bottom wall 60 preferably either is concave-shaped, as shown in the first embodiment of FIG. 1, or has a shape wherein the opposite end portions of the bottom wall are oppositely inclined at about forty-five degrees and then interconnected by a generally flat or planar intermediate portion, as shown in the second (and preferred) embodiment of FIGS. 7-8, discussed in more detail below. Also, preferably, several limited regions 65 between the respective interior surfaces 48-54 of the gusset and side wall lower portions 24, 28, 34, 36, as outlined in FIGS. 1, 6B, 7 and 8 are left unsealed to minimize the amount of distortion of the material in the band 56 which ordinarily results from the heat sealing process. Regions 65 also provide a "cool corner" for the user to hold onto when emptying hot contents from the bag.

As shown in FIGS. 4 and 5, the formation of the band 56 (see FIG. 1) of the stand-up base 58 is completed by joining together the opposite right longitudinal edges 66, 68 and left longitudinal edges of the front and rear bottom gusset walls 16, 18 of FIG. 1 by the formation of respective heat seals 70. Only the right longitudinal edges 66, 68 of the gusset walls 16, 18 and the right heat seal 70 are shown in detail in FIG. 5. The heat seals 70 are formed at contiguous portions of the thermoplastic material 40 on the facing exterior surfaces 44, 46 (See FIG. 2) thereof at the longitudinal edges 66, 68 adjacent the gussetted portion of the bag 10. The upright support band 56 now consitutes a continuous self-standing structure which along with the bottom wall 60 provides a sturdy and stable stand-up base 58 for the bag 10 which renders the bag capable of standing up by itself before, during and after being filled. The interaction of support band 56 with the film stiffness and other structural features permits the bag to stand up when empty or even when filled with boiling water.

Additionally, the opposite right longitudinal edges 72 and left longitudinal edges 74 of the front and rear side walls 12, 14 are joined with the aforementioned right longitudinal edges 66, 68 and left longitudinal edges of the gusset walls 16, 18 by heat seals 76 formed at contiguous portions of the thermoplastic material 38 on interior surfaces thereof, as shown both in FIGS. 3 and 4. These heat seals 76 provide a reliable, leak-proof seal along the opposite longitudinal edges adjacent the non-gussetted portion of the bag 10. As seen in FIG. 3, an additional end seal 78 can be provided between the thermoplastic material 40 on the exterior surfaces of the longitudinal edges 72, 74 of the side walls 12, 14 if the bags 10 are severed from one another by using a hot wire or hot knife severing technique. However, this additional seal is not essential. A guillotine knife cut at the center of the bar seal is preferred for the sake of process simplicity.

As seen in FIG. 1, the bag 10 also may preferably include an openable and closable closure device 80 of any suitable conventional design although a zipper-type closure device is preferred. The device 80 is defined on the front and rear side walls 12, 14 just below and adjacent to the bag mouth 20 defined at the upper edges 12A, 14A, thereof. The components 80A, 80B of the closure device 80, as seen schematically in FIG. 6, can be integrally formed on the film 82 or laminated thereon.

In the bag of the first embodiment shown in FIGS. 1-5, a bag with an approximate 6 cup capacity (6.2 cups) would have a preferred height of approximately 7.0 inches, a preferred width of aprroximately 9.5 inches, and a preferred gusset height of approximately 2.0 inches. For a smaller bag, such as one having a 3.4 cup capacity, it would preferrably have a height of 5.5 inches, a width of 8.0 inches, and a gusset height of 2.0 inches.

Turning now to FIGS. 6 and 6A-6C, the steps involved in the method of the present invention for making the stand-up reclosable plastic bag 10 are shown in block form and the states of a bag at the various stages in its formation are illustrated. The process may be a continuous, a semi-continous or a multi-step batch process. The components used in the method are individually well-known in the art and to illustrate them in detail herein would not make it easier to understand the method of the present invention. The components used in the method herein are generally the same as components schematically illustrated in the afore-cited U.S. patents to Doyen et al and Kan. The differences reside not in the components per se but the steps they are employed to carry out in the method of the present invention.

Film web roll 84 represents the supplying of a web of the multi-layered film 82 from a roll thereof. Alternatively a web of multi-layered film 82 may be supplied directly, as fabricated, from an extrusion and/or laminating line. As described above, the film 82 has the two different thermoplastic materials 38, 40 (FIG. 2), for instance polyethylene and Nylon, which are heat-sealable upon applying of heat at temperatures within different ranges, as described previously.

Film folding, gusset forming and closure locking station 86 represents performance of the steps of folding the film 82 to form the front and rear side walls 12, 14 and to form the front and rear bottom gusset walls 16, 18 (FIGS. 1 and 2) being disposed and folded inwardly between the side walls so that the Nylon and polyethylene materials are respective on the interior and exterior surfaces of the side and gusset walls, as was described previously. Also, station 86 represents the locking or closing of the components 80A, 80B of the closure device 80. The state or condition of a partially completed bag after leaving block 86 would resemble that depicted in FIG. 6A. All heat sealing steps can be interchanged, reversed in order or combined into a single sealing step containing differential temperature zones.

Next, block 88 represents the applying of heat, by use of shoe or bar-like members, to the lower portions 24, 28 of the gusset walls and lower portions 34, 36 of the side walls 12, 14 (FIG. 2). The application of heat within the lower one of the two aforementioned temperature ranges causes joining of the lower portions at their interior surfaces, but not at their exterior surfaces, by forming the above-described heat seals 62, 64 in FIG. 2 and as represented by the dotted regions in FIG. 6B. That figure shows the condition of the partially completed bag after leaving block 88. Partial formation of the support band 56 has now taken place.

The next successive blocks 90 and 92 can be arranged as shown or reversed. Block 90 represents forming heat seals 76 (FIG. 4 and 5) as depicted by the dotted regions in FIG. 6C, to join the front and rear side walls 12, 14 with the front and rear bottom gusset walls 16, 18 along the opposite longitudinal edges thereof at contiguous portions of the polyethylene material 38 on their interior surfaces. Heat seals 76 are formed by applying heat at the lower temperature range as before using conventional sealing bars.

Block 92 represents forming heat seals 70 (FIG. 5) to join the front and rear bottom gusset walls together along their opposite longitudinal edges at contiguous portions of the Nylon material 40 on the exterior surfaces thereof and thereby complete formation of the upright support band 56, as described above. To form the heat seals 70, heat is now applied to the gusset wall edges at a temperature within the higher temperature range using conventional sealing bars.

Block 92 can also represent a combined or separate step of separating the film 82 through into completed plastic bags by severing the film through at each of the heat seals at each of the longitudinal edges of the walls. If the sealing and severing are combined, then a conventional hot wire or hot knife is used. However, if they are performed successively, then a tab sealing bar is used to seal the gusset edges followed by an unheated conventional severing knife.

Figure 7:
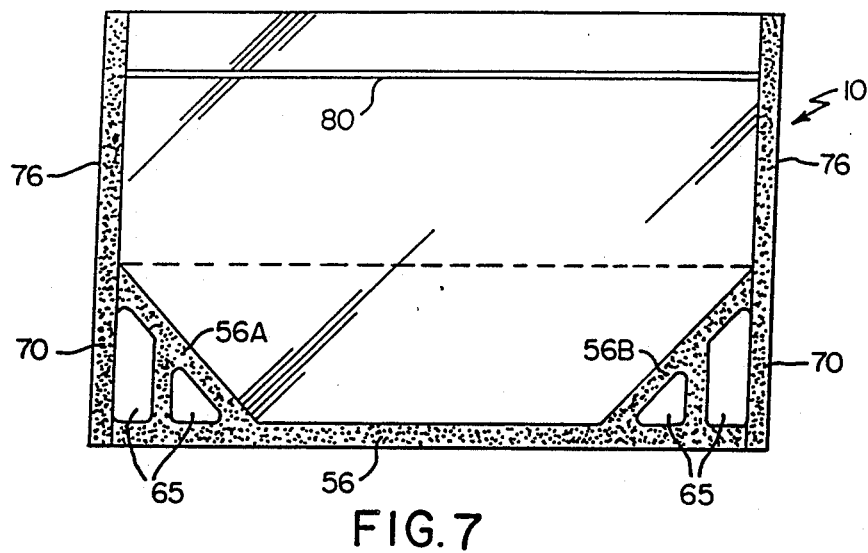
FIG. 7 is a side plan view of a second embodiment of a stand-up plastic bag constructed in accordance with the principles of the present invention.
Figure 8:
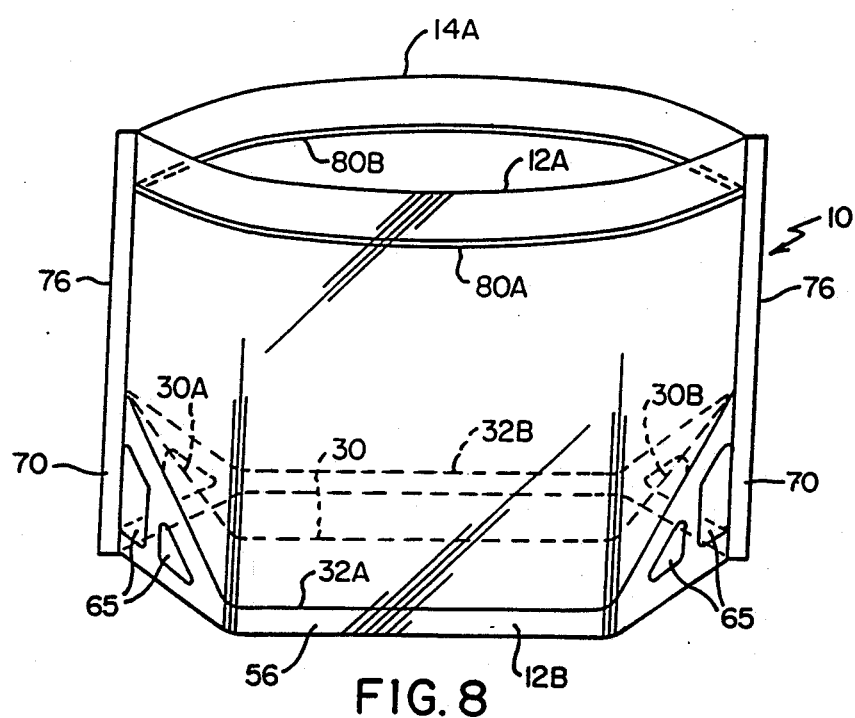
FIG. 8 is a perspective view of the bag of the second embodiment.

Referring now to FIGS. 7-8, there is shown a second and preferred embodiment of bag 10. The preferred stand-up, reclosable bag shown in FIGS. 7-8 is made by the same procedure shown in FIG. 6 and utilizes the same materials and structural elements described with reference to FIGS. 1-5 and, therefore like reference numerals have been used.

However, unlike the bag illustrated in the first embodiment of FIGS. 1-5 wherein a concave-shaped bottom wall 60 is used, the bag of FIGS. 7-8 has a bottom wall with end portions oppositely inclined at about forty-five degrees. This is best seen in FIG. 8 where center fold line 30 is horizontal in the middle portion thereof, but has an approximate 45° incline at the ends 30A and 30B, thereof.

That approximate 45 degree incline is essentially the same as straight 45 degree heat seal of support band 56 at the opposite ends 56A and 56B thereof, as best seen in FIG. 7. The use of approximate 45° angles at ends 30A and 30B of center fold line 30 and at ends 56A and 56B of support band 56 results in flat bottom with an essentially rectangular base. That design has been found to be the most stable. In particular it optimizes hot liquid stability with the bag either open or closed. This is because the bag design of FIGS. 7-8 has a lower center of gravity which is especially important with hot liquids. A hot liquid softens the bag film and the softened bag tends to "sag" more than an unheated bag. The lower center of gravity better accommodates the "sag" and prevents the bag from tipping over under those conditions.

In the preferred bag design, of the second embodiment shown in FIGS. 7-8 a bag with an approximate 6 cup capacity (6.1 cups) would have a preferred height of approximately 6.0 inches, a preferred width of approximately 10.0 inches and a preferred gusset height of approximately 2.0 inches. For a smaller bag, such as having an approximate 2 cup capacity, a smaller gusset height of approximately 1.5 inches may be used; although, a 2.0 inch gusset length is still preferred for process simplicity. For example, a bag with a 2.9 cup capacity having 5 inch height, an 8 inch width, and a gussett height of 2.0 inches was found to be particularly stable.

Having thus described the stand-up plastic bag and method of making same of the present invention in detail and by reference to a preferred embodiment thereof, it will be apparent that certain modifications and variations are possible without departing from the scope of the invention defined in the appended claims.

What is claimed is:

1. A method of making a stand-up plastic bag, comprising the steps of:
   (a) supplying a multi-layered film of first and second thermoplastic materials, said first material being heat-sealable at a temperature within a first temperature range and said second material being heat-sealable at a temperature within a second temperature range which is a range of temperatures higher than the temperatures in said first temperature range;
   (b) folding said film to form a pair of front and rear side walls and a pair of front and rear bottom gusset walls disposed between said side walls with said first and second materials being on respective interior and exterior surfaces of said side and gusset walls;
   (c) heat sealing at a temperature within said first temperature range to form a first set of heat seals which join lower portions of said front and rear bottom gusset walls with corresponding lower portions of said front and rear side walls at contiguous regions of said first material on said interior surfaces thereof and to form a bottom wall of connected upper portions of said front and rear bottom gusset walls which extend between said front and rear side walls, said first set of heat seals forming a support band which is connected to and extends below the periphery of said bottom wall;
   (d) heat sealing at a temperature within said first temperature range to form a second set of heat seals which join said front and rear side walls with said front and rear bottom gusset walls along opposite longitudinal edges thereof at contiguous portions of said first material on interior surfaces of said longitudinal edges of said walls;
   (e) heat sealing at a temperature within said second temperature range to form a third set of heat seals which join said front and rear bottom gusset walls together along their opposite longitudinal edges at contiguous portions of said second material on exterior surfaces thereof and thereby complete formation of said support band as a continuous self-standing structure to define with said bottom wall a stand-up base on a bag; and (f) separating said film into completed plastic bags by severing said film through at each of said heat seals at each of said longitudinal edges of said walls.

2. The method of claim 1 in which said first temperature range is from about 125° to 190° C.

3. The method of claim 2 in which said temperature within said first temperature range is preferably approximately 130° to 150° C.

4. The method of claim 1 in which said second temperature range is from about 190° to 280° C.

5. The method of claim 4 in which said temperature within said second temperature range is preferably approximately 210° to 250° C.

6. The method of claim 1 in which said film is a web of coextruded layers of said first and second thermoplastic materials.

7. The method of claim 1 in which said film contains components of a closure device thereon.

8. The method of claim 1 in which said support band has a straight forty-five degree heat seal at the opposite ends thereof.

* * * * *